US012326899B2

(12) United States Patent
Lennon et al.

(10) Patent No.: US 12,326,899 B2
(45) Date of Patent: Jun. 10, 2025

(54) METHODS AND SYSTEMS FOR ADAPTING PLAYLISTS

(71) Applicant: Spotify AB, Stockholm (SE)

(72) Inventors: Miles Lennon, New York, NY (US); Rafael Mumme, New York, NY (US); Jason Gavris, Wellesley, MA (US); Minwei Gu, Malden, MA (US); Mateo Rando, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/854,200

(22) Filed: Jun. 30, 2022

(65) Prior Publication Data

US 2023/0047586 A1 Feb. 16, 2023

Related U.S. Application Data

(63) Continuation of application No. 16/820,562, filed on Mar. 16, 2020, now Pat. No. 11,403,341, which is a continuation of application No. 15/282,375, filed on Sep. 30, 2016, now Pat. No. 10,628,482.

(51) Int. Cl.
| | |
|---|---|
| *G06F 16/638* | (2019.01) |
| *G06F 16/29* | (2019.01) |
| *G06F 16/438* | (2019.01) |
| *G06F 16/635* | (2019.01) |
| *H04W 4/02* | (2018.01) |

(52) U.S. Cl.
CPC ............ *G06F 16/639* (2019.01); *G06F 16/29* (2019.01); *G06F 16/4387* (2019.01); *G06F 16/637* (2019.01); *H04W 4/025* (2013.01)

(58) Field of Classification Search
CPC .... G06F 16/639; G06F 16/29; G06F 16/4387; G06F 16/637; G06F 16/687; H04W 4/025
See application file for complete search history.

(56) References Cited

U.S. PATENT DOCUMENTS

| | | | |
|---|---|---|---|
| 7,682,028 B2 | 3/2010 | Maeda et al. | |
| 7,873,988 B1 | 1/2011 | Issa et al. | |
| 8,027,634 B1 | 9/2011 | Warner et al. | |

(Continued)

FOREIGN PATENT DOCUMENTS

| | | |
|---|---|---|
| EP | 1564621 A1 | 8/2005 |
| EP | 2677757 A2 | 12/2013 |

OTHER PUBLICATIONS

Ahlin, Notice of Allowance, U.S. Appl. No. 14/668,732, Jun. 9, 2015, 12 pgs.

(Continued)

*Primary Examiner* — Cheyne D Ly
(74) *Attorney, Agent, or Firm* — Morgan, Lewis & Bockius LLP

(57) ABSTRACT

A server receives a request to play a selected playlist from a first electronic device associated with a host listener. The playlist includes audio items having a common attribute. The server also receives an identity of a guest listener having a second electronic device and retrieves an indication of taste of the guest listener based on the received identity. The server selects an additional audio item based at least in part on the indication of taste of the guest listener and the common attribute of the audio items of the selected playlist, and incorporates the additional audio item into the selected playlist.

19 Claims, 11 Drawing Sheets

(56) References Cited

U.S. PATENT DOCUMENTS

| | | |
|---|---|---|
| 8,145,532 B2 | 3/2012 | Jones et al. |
| 8,296,675 B2 | 10/2012 | Falchuk |
| 8,838,730 B2 | 9/2014 | Ishii |
| 9,195,383 B2 | 11/2015 | Garmark et al. |
| 10,872,116 B1* | 12/2020 | Yim ........................ G06F 16/61 |
| 2004/0103312 A1 | 5/2004 | Messerges et al. |
| 2004/0235521 A1 | 11/2004 | Pradhan et al. |
| 2005/0036509 A1 | 2/2005 | Acharya et al. |
| 2006/0173974 A1 | 8/2006 | Tang |
| 2006/0258289 A1 | 11/2006 | Dua |
| 2007/0085846 A1 | 4/2007 | Yang et al. |
| 2008/0051025 A1 | 2/2008 | Casati et al. |
| 2008/0209013 A1* | 8/2008 | Weel ........................ H04L 67/10 709/219 |
| 2008/0212944 A1 | 9/2008 | Khedouri et al. |
| 2008/0281909 A1 | 11/2008 | Shao et al. |
| 2008/0313264 A1 | 12/2008 | Pestoni |
| 2008/0320543 A1 | 12/2008 | Wang et al. |
| 2009/0217036 A1 | 8/2009 | Irwin et al. |
| 2011/0054646 A1* | 3/2011 | Hernandez ............ G06F 16/632 701/117 |
| 2012/0158531 A1 | 6/2012 | Dion et al. |
| 2012/0290648 A1* | 11/2012 | Sharkey ................ H04W 4/023 709/204 |
| 2012/0290653 A1 | 11/2012 | Sharkey |
| 2012/0311444 A1 | 12/2012 | Chaudhri |
| 2013/0139271 A1 | 5/2013 | Arrelid et al. |
| 2013/0225081 A1 | 8/2013 | Doss et al. |
| 2013/0231044 A1 | 9/2013 | Wang |
| 2013/0262469 A1 | 10/2013 | Whitman |
| 2013/0268593 A1 | 10/2013 | Parekh |
| 2013/0346859 A1 | 12/2013 | Bates et al. |
| 2014/0029921 A1 | 1/2014 | Warren et al. |
| 2014/0059644 A1 | 2/2014 | Shin et al. |
| 2014/0096219 A1 | 4/2014 | Lang et al. |
| 2014/0136601 A1 | 5/2014 | Kent et al. |
| 2014/0279817 A1 | 9/2014 | Whitman et al. |
| 2015/0150110 A1 | 5/2015 | Canning et al. |
| 2015/0319224 A1 | 11/2015 | Rong |
| 2016/0088044 A1 | 3/2016 | Wolf et al. |
| 2016/0174036 A1 | 6/2016 | Ruhstaller et al. |
| 2017/0039228 A1* | 2/2017 | Skafi ................... G06F 16/2329 |
| 2020/0042554 A1* | 2/2020 | Liu ....................... G06F 16/687 |

OTHER PUBLICATIONS

Ahlin, Office Action, U.S. Appl. No. 14/817,083, Oct. 15, 2015, 16 pgs.

Ahlin, Final Office Action, U.S. Appl. No. 14/817,083, Mar. 18, 2016, 16 pgs.

Ahlin, Notice of Allowance, U.S. Appl. No. 14/817,083, Jul. 18, 2016, 8 pgs.

Ahlin, Notice of Allowance, U.S. Appl. No. 14/883,413, Feb. 2, 2016, 8 pgs.

Ahlin, Office Action, U.S. Appl. No. 15/250,614, Sep. 11, 2017, 13 pgs.

Lennon, Office Action, U.S. Appl. No. 15/354,920, Mar. 17, 2017, 7 pgs.

Lennon, Final Office Action, U.S. Appl. No. 15/354,920, Jul. 19, 2017, 12 pgs.

Lennon, Office Action, U.S. Appl. No. 15/282,375, Apr. 21, 2017, 7 pgs.

Lennon, Final Office Action, U.S. Appl. No. 15/282,375, Sep. 27, 2017, 8 pgs.

Lennon, Notice of Allowance, U.S. Appl. No. 15/282,375, Dec. 27, 2019, 5 pgs.

Lennon, Office Action, U.S. Appl. No. 16/820,562, Dec. 7, 2021, 7 pgs.

Spotify AB, Extended European Search Report, EP15183490.0, Nov. 2, 2015, 9 pgs.

Spotify AB, Communication Pursuant to Article 94(3), EP15183490.0, Jul. 31, 2017, 6 pgs.

Spotify AB, International Search Report, PCTIB2015002605, Apr. 19, 2016, 4 pgs.

Spotify AB, International Preliminary Report on Patentability, PCTIB2015002605, Jul. 4, 2017, 9 pgs.

* cited by examiner

Associated gross playlist 620

| | Artist name | Track name | Tempo | Key | Duration |
|---|---|---|---|---|---|
| ◉ | Christina Perri | burning gold - Autograf Remix | 98 | E minor | 05:33 |
| ◉ | GRiZ | For The Love - Big Wild Remix | 101 | Bb minor | 02:53 |
| ◉ | DJ Snake, Yellow Claw & Spanker | Slow Down | 100 | C major | 04:09 |
| ◉ | French Horn Rebellion | The Fire (Autograf Remix) | 108 | E minor | 06:27 |
| ◉ | GRiZ | Smash the Funk | 103 | F# major | 06:50 |
| ◉ | Big Wild | La Brisa | 162 | A major | 03:16 |
| ◉ | Kolekttv Turmstrasse | Schwindelig - Original | 100 | B minor | 04:14 |
| ◉ | The Chainsmokers | Waterbed | 105 | B major | 03:30 |
| ◉ | GRiZ | The Anthem (feat. Mike Avery) | 103 | D major | 04:49 |
| ◉ | Leona Lewis | Private Party - Sidelmann Pool Party Edit | 101 | G minor | 03:26 |
| ◉ | Flume | Left Alone | 85 | E minor | 03:29 |
| ◉ | GRiZ | A Fine Way to Die (feat. Orlando Napier) | 103 | G minor | 06:40 |
| ◉ | Kove | Shaded In | 168 | Ab minor | 03:12 |
| ◉ | Flume | On Top | 95 | F# major | 03:51 |
| ◉ | Clean Bandit | Real Love - The Chainsmokers Remix | 105 | A minor | 04:02 |
| ◉ | The Chainsmokers | Roses | 100 | E major | 03:46 |
| ◉ | Gimsli | Ain't No Sunshine - Deep Chills Radio Edit | 110 | A minor | 02:49 |
| ◉ | Jack Ü | To Ü (feat. AlunaGeorge) | 160 | Bb minor | 03:57 |

Figure 6B

METHODS AND SYSTEMS FOR ADAPTING PLAYLISTS

RELATED APPLICATIONS

This application is a continuation application of U.S. patent application Ser. No. 16/820,562, filed Mar. 16, 2020, which is a continuation application of U.S. patent application Ser. No. 15/282,375, filed Sep. 30, 2016, now U.S. Pat. No. 10,628,482, each of which is incorporated by reference herein in its entirety.

TECHNICAL FIELD

The present disclosure generally relates to the provision (e.g., streaming) of media, and more particularly to adapting a playlist including a queue of playable audio items (e.g., songs).

BACKGROUND

As computer technology has improved, the digital media industry has evolved greatly in recent years. Users are able to use electronic devices such as mobile communication devices (e.g., cellular telephones, mobile telephones, smart phones, tablet computers (also known as tablets), etc.) to consume media content such as music, video, etc. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than receiving a complete file in physical media (such as a CD or a DVD, or downloading the entire file into memory) before consuming the media content.

At social gatherings, users often wish to share media content (e.g., with friends, relatives, and new acquaintances). For example, a party host may access media content on a portable electronic device, such as a mobile phone or a tablet computer, and present media content through a media presentation system (e.g., play music on one or several speakers).

SUMMARY

In a first of its aspects, this disclosure concerns a method for playlist adaption. The method is performed by a server having one or more processors and memory storing instructions for execution by the one or more processors. The method comprises receiving a request to play a selected playlist from a first electronic device associated with a host listener. The playlist includes audio items having a common attribute. The method further comprises receiving an identity of a guest listener having a second electronic device, and retrieving an indication of taste of the guest listener based on the received identity. An additional audio item is selected based at least in part on the indication of taste of the guest listener and the common attribute of the audio items of the selected playlist. The additional audio item is incorporated into the selected playlist.

In some embodiments, the server receives the information about the identity of the guest listener from the first electronic device. Alternatively, the server receives the identity of the guest listener from the second electronic device.

In some embodiments, the additional audio item is selected from audio items of a gross playlist associated with the selected playlist. The gross playlist includes more audio items than the selected playlist and the audio items of the gross playlist have the common attribute.

In some embodiments, the indication of taste of the guest listener includes a taste profile parameter of the guest listener. The additional audio item may be selected from audio items that match the taste profile parameter of the guest listener and also have the common attribute.

The indication of taste of the guest listener may include listening counts for respective audio items. The common attribute of the selected playlist may be related to the genre of the audio items.

In some embodiments, the received request to play the selected playlist may further comprise receiving geographic information about the first electronic device, receiving geographic information about the second electronic device, and determining that the first and second electronic devices are within a same geographic area. The additional audio item is selected in response to determining that the first and second electronic devices are within the same geographic area.

In a second of its aspects, a server comprises one or more processors and memory storing instructions executable by the one or more processors that cause the server to perform the above method.

In a third of its aspects, this disclosure concerns a non-transitory computer-readable storage medium storing one or more programs for execution by a server having one or more processors and memory. The one or more programs comprise instructions for performing the above method. Various embodiments described hereinabove may allow a first electronic device, associated with a host listener, to adapt a playlist selected by any user of the first electronic device to the taste of listeners. In an example scenario at a social gathering (e.g. a party) the taste of several guest listeners (having their respective electronic device) may be taken into account by adding additional audio items to the selected playlist based on the taste of the guest listeners. In this way the taste of the listeners will be reflected in the selected and updated playlist. In some embodiments, this adaption of the selected playlist may be performed without involvement from the listeners. This adaption may lead to improved user experiences at social gatherings.

BRIEF DESCRIPTION OF DRAWINGS

These and other aspects, features, and advantages will be apparent and elucidated from the following description of various embodiments, reference being made to the accompanying drawings, in which:

FIG. 6B schematically illustrates an example embodiment of a gross playlist associated with the selected playlist;

Like reference numerals refer to corresponding parts throughout the figures and description.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout this description.

It may be desirable to adapt a playlist to the taste of listeners that are located within a geographic area. The playlist may be selected at a first electronic device associated with a host listener and adapted in response to being selected. Other electronic devices, each associated with a guest listener, that are within the same predefined geographic area as the first electronic device may be recognized by the first electronic device as being within the same predefined geographic area as the first electronic device. The first electronic device receives information about an identity of the guest listener located within the same geographic area as the first electronic device. The identity is stored on the electronic device associated with the guest listener. The identity is used to select an additional audio item for incorporation into the selected playlist. In some embodiments, the identity is used to retrieve a taste profile parameter of the guest listener (or other indication of taste of the guest listener), which is used to select the additional audio item to be incorporated into the queue of audio items of the selected playlist. In some embodiments, the selected additional audio item has at least one attribute that is in common with the audio items of the selected playlist. The adaption of the selected playlist may be done without any user involvement from the guest listeners. This, in turn, may lead to improved experiences for guest listeners that are attending a social gathering such as a party of the host listener. However, it should be understood that any electronic device may be used as the "host device" and it is also possible that an electronic device may have the role of both "host device" and "guest device," for example when using more than one media content delivery system at the social gathering.

Figure 1:
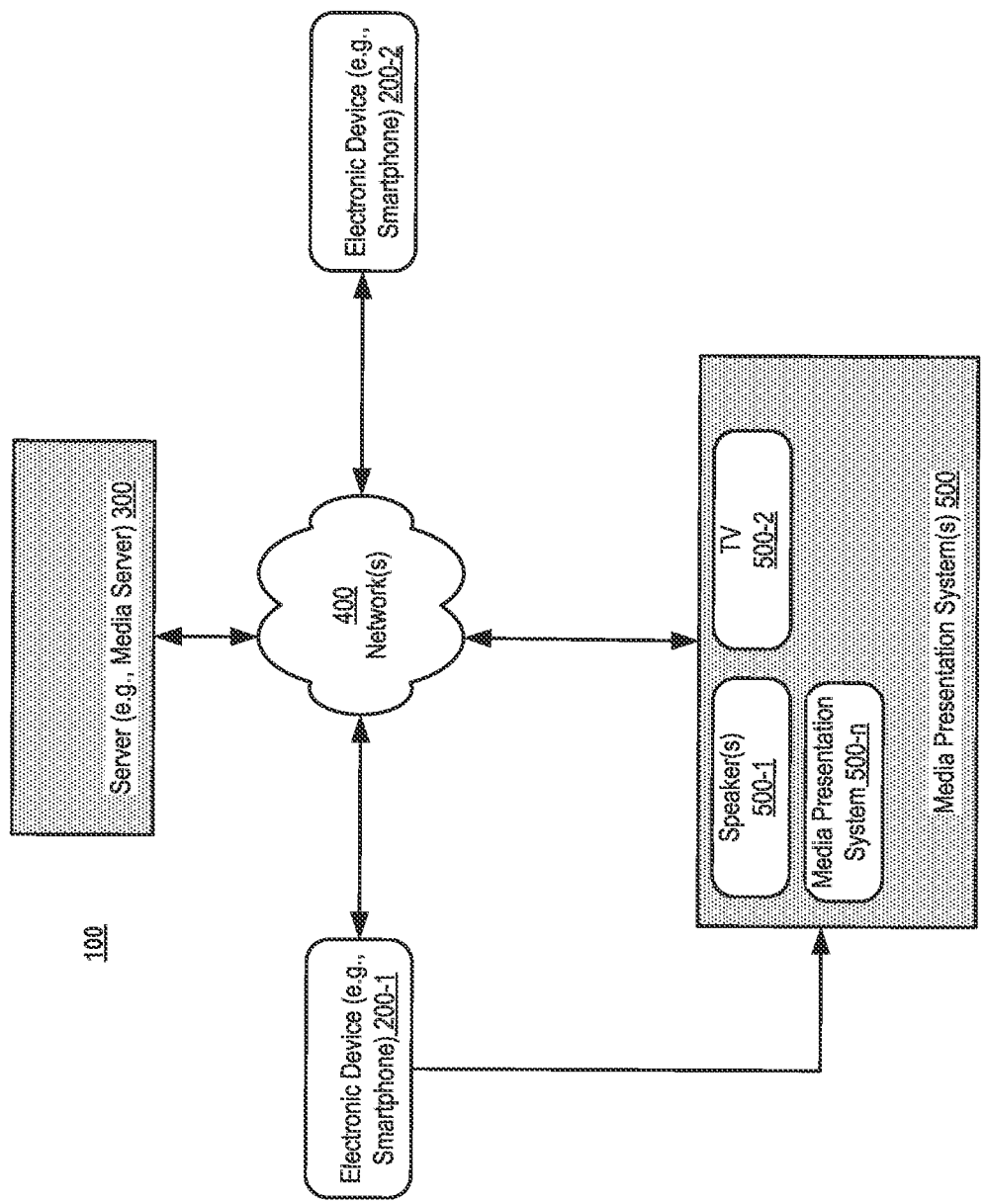
FIG. 1 is a block diagram schematically illustrating an audio content delivery system in accordance with some embodiments.

To give context to the various embodiments described in this disclosure, FIG. 1 schematically illustrates an audio content delivery system 100 in accordance with some embodiments. The audio content delivery system 100 may comprise several electronic devices 200 (e.g., first electronic device 200-1 and second electronic device 200-2), one or more servers 300 (e.g., computer server(s) such as audio content server(s) (sometimes referred to as media server(s))), and one or more audio presentation systems (e.g., media presentation systems 500 including speaker(s) 500-1, television (TV) 500-2, and/or other media presentation systems 500-n).

In some embodiments, an electronic device 200 may be a mobile telephone, such as a smart phone. Alternatively, an electronic device 200 may be a tablet computer. In yet other embodiments, an electronic device 200 may be any other electronic device capable of playing back and/or controlling the playback of audio content such as, for example, a personal computer, a laptop, or a mobile electronic device (e.g. a handheld entertainment device, a digital media player, or other media device).

One or several networks (e.g., network(s) 400) may communicatively connect each component of the media content delivery system 100 with other components of the media content delivery system 100. The network(s) 400 may include public communications networks, private communication networks, or a combination of both public and private communication networks. For example, the networks(s) may include any network(s) such as the Internet, other wide area networks (WAN), wireless wide area networks (WWAN), local area networks (LAN), wireless local area networks (WLAN), virtual private networks (VPN), metropolitan area networks (MAN), peer-to-peer networks, and/or ad-hoc networks. As will also be appreciated, the network(s) 400 may thus comprise cellular telecommunications network(s) and/or non-cellular network(s).

In some embodiments, as is illustrated in FIG. 1, an electronic device 200 (e.g., the first electronic device 200-1 in the following example) is capable of remotely controlling one or more of the media presentation systems 500. To this end, the first electronic device 200-1 may for example implement, or otherwise utilize, any of the techniques described in the international patent application PCT/IB2013/001938 (published under WO2014/001913A2) and corresponding U.S. Pat. No. 9,195,383. For example, it is possible for a user of the first electronic device 200-1 to remotely control the presentation of media at any one or a combination of the media presentation systems 500. WO2014/001913A2 and U.S. Pat. No. 9,195,383 are incorporated herein by reference in their entirety. For example, the first electronic device 200-1 may receive a media control command for a media presentation system 500 (e.g. speaker(s) 500-1). In response to receiving this media control command, the first electronic device 200-1 sends a server media control request to the server 300 and a local media control request to the media presentation system 500, which may be located within the same local network (e.g. a LAN) as the first electronic device 200-1 (i.e., a local network to which both the first electronic device 200-1 and the media presentation system 500 are connected). The server media control request may be sent to the server 300 over the Internet. Typically, but not necessarily, the server 300 is associated with an Internet Protocol (IP) address outside the space of the local network to which both the first electronic device 200-1 and the media presentation system 500 are connected. The first electronic device 200-1 and the media presentation system 500 may thus be associated with IP addresses within the same sub network. The first electronic device 200-1 may hence provide a user interface that allows a user to select media content for presentation by the electronic device 200-1 itself and, also, to generate media control request(s) to cause the media content to be presented, or played, by the media presentation system 500. Furthermore, the server media request and the local media request are both configured to cause a media control operation, initiated at the first electronic device 200-1, to be implemented at the media presentation system 500.

In an example scenario related to a social gathering, a host (i.e., a user) may thus interact with his or her first electronic device 200-1 to remotely control the playback of media content at the media presentation system 500 (e.g. the playback of a selected playlist of streamed music through loudspeakers(s) 500-1). In this way, it is for example possible for the host (i.e., the user) to control the playback of music that is to be played at the social gathering (e.g. a party).

While the above example has been described with respect to the first electronic device 200-1, it should be appreciated that the second electronic device 200-2 may have the same features and, thus, employ the same functionality as the first electronic device 200-1. For example, the second electronic device 200-2 may also implement, or otherwise utilize, any of the techniques described in WO2014/001913A2.

Figure 2:
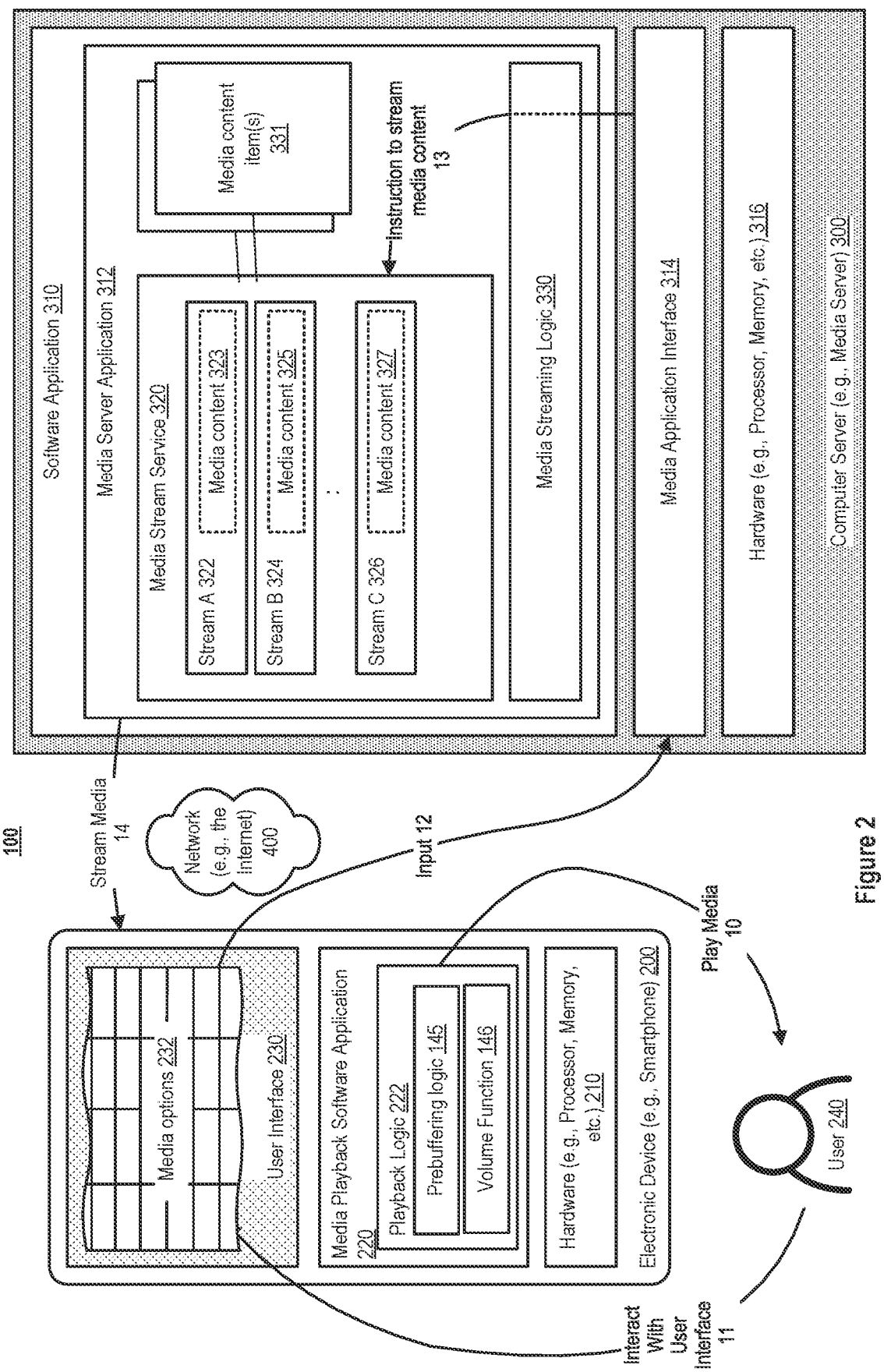
FIG. 2 illustrates an example embodiment of a system for playback of an audio content stream and/or dynamic control of a queue of playable audio items, in accordance with some embodiments.

Turning now to FIG. 2, an example environment where embodiments of this disclosure may be applied is shown. An electronic device 200 (e.g. the first electronic device 200-1 or the second electronic device 200-2 of FIG. 1) may be communicatively connected to the server 300 via the network 400 (e.g. the Internet), as described above. Only a single electronic device 200 and a single server 300 are shown in FIG. 2. However, the server 300 may support the simultaneous use of multiple electronic devices 200-1, 200-2, etc., and/or the electronic device 200 can simultaneously access media content at multiple servers 300. FIG. 2 is intended more as a functional description of the various features, or components, which may be present in one or more servers, rather than a structural schematic of the various implementations described throughout this disclosure. In practice, components shown separately could be combined and some components could be separated.

In the following description and in order not to obscure the detailed description with unnecessary detail, the media content will in general be exemplified to be audio content (e.g. music). This should, however, not be interpreted as limiting the scope of the disclosed embodiments.

As is schematically shown in FIG. 2, the electronic device 200 (e.g., the first electronic device 200-1 or the second electronic device 200-2, FIG. 1) may be used for the playback of media content (e.g., audio content such as music), which is provided by the server 300. The electronic device 200 includes one or several physical computer resources, or hardware resources, 210. The hardware resources 210 include, for example, one or several processors (or, processing circuitry), a communications interface (or, communication circuitry), and one or several memories. Likewise, the server 300 (e.g., a media server) may include one or several physical computer resources, or hardware resources, 316. The hardware resources 316 include, for example, one or several processors (or, processing circuitry), a communications interface (or, communication circuitry) and one or several memories.

The server 300 may include an operating system or other processing system which supports execution of a software application 310, including a media server application 312 which may be used, for example, to stream media content such as audio content (e.g., music). A media stream service 320 may be used to buffer media content, for streaming to one or more media streams 322, 324 and 326. A media application interface 314 may receive requests from electronic devices 200 or other systems to retrieve media content items 331 from the server 300.

Media content items 331, or media items, may be provided, for example, within a first storage such as a memory (e.g., including a database), or may be received by the server 300 from another source (not shown). This other source (not shown) could be external to the server 300 (i.e. located remotely from the server 300).

A media streaming logic 330 may be used to retrieve or otherwise access the media content items 331 in response to requests from electronic devices 200 or other systems, and populate the media stream service 320 with streams 322, 324 and 326 of corresponding media content data 323, 325 and 327 that may be returned (e.g., streamed) to the requesting electronic device 200.

The electronic device 200 comprises a user interface 230. The user interface 230 may, among other things, be adapted to display or otherwise provide a visual array of media options 232 and to determine user input. The visual array of media options 232 may for example be provided as a two-dimensional grid, a list, or other visual array format. Each media option in the visual array of media options 232 may correspond to a respective media stream 322, 324 or 326.

Selecting a particular media option within the visual array 232 may be interpreted as a request or instruction to the media server application 312 to stream or otherwise return a corresponding particular media content item. For example, in accordance with some embodiments, the software application 310 at the server 300 streams or otherwise communicates media content to the electronic device 200, wherein the user interface 230 at the electronic device 200 is adapted to display a plurality of media options that correspond to respective media streams.

In accordance with some embodiments, the electronic device 200 may also include a media playback application 220, which includes a playback logic 222 with pre-buffering logic 145 and volume function 146. The playback logic 222 is used to control the playback of media content that is received from the media server application 312, for playback by the electronic device 200, as described in further detail below.

A user 240 may interact 11 with the user interface 230 of the electronic device 200 and issue requests, for example the playing of a selected media option (e.g., at the electronic device 200 or on a media presentation system 500). The user's selection of a particular media option may be communicated as input 12 to the media server application 312, via the media application interface 314. The media server application 312 may then be instructed 13 to stream 14 corresponding media content, including one or more streams of media content data 323, 325 and 327 to the user's electronic device 200 and/or a media presentation system 500 (FIG. 1). In accordance with some embodiments, pre-buffering requests from the electronic device 200 may also be communicated as input 12 to the media server application 312 via the media application interface 314. At the electronic device 200, in response to the user's interaction with the user interface 230, the media playback application 220, including the playback logic 222, may play 10 the requested media content to the user 240. Alternatively, the requested media content is played at a media presentation system 500 in response to the user's interaction with the user interface 230.

Figure 3:
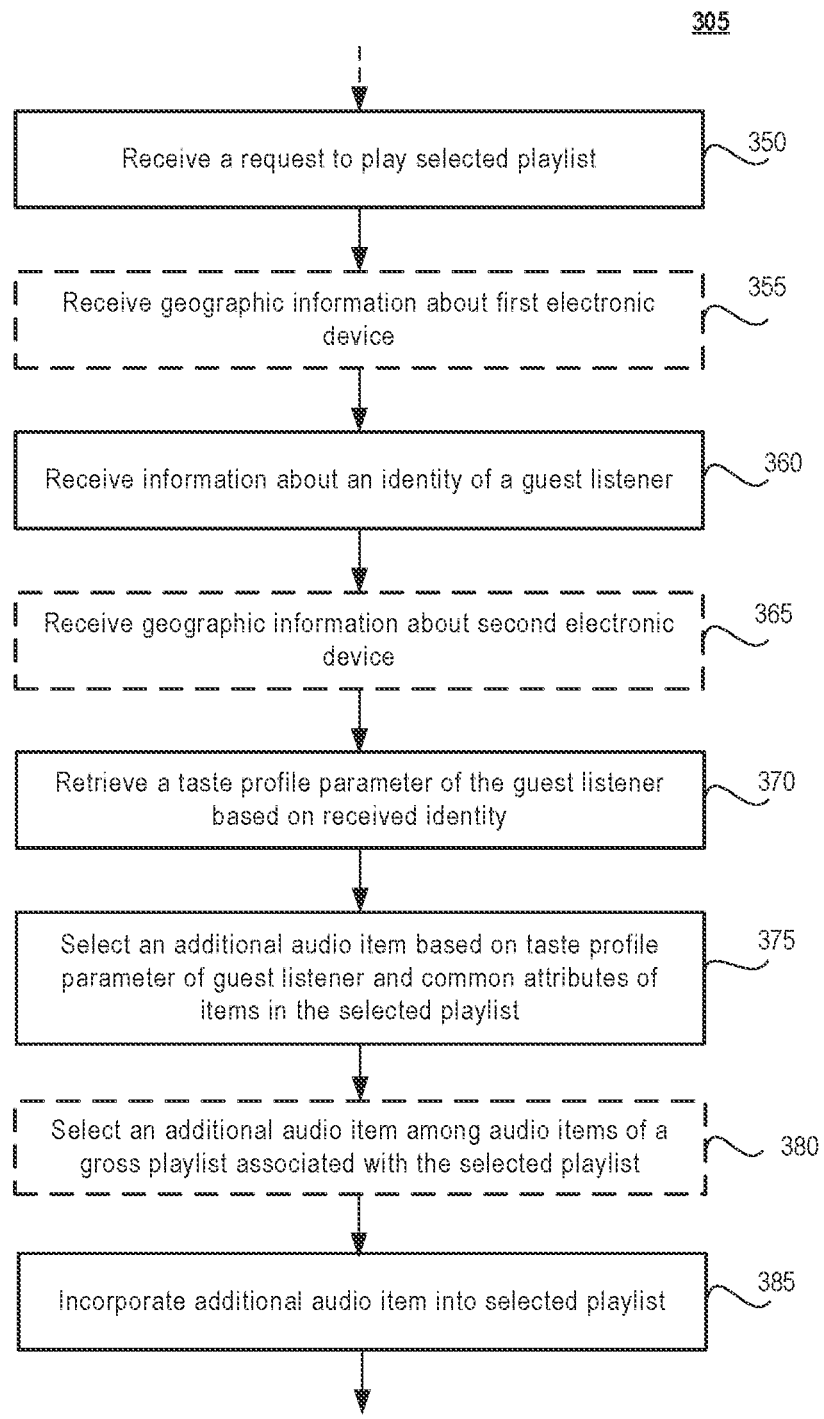
FIG. 3 schematically illustrates a flowchart of a method in accordance with some embodiments.

Reference is now made to FIG. 3, which schematically illustrates a flowchart of a method 305 for adapting a selected playlist to the taste of listeners that are located within a geographic area, in accordance with some embodiments. The method 305 may be performed by, or otherwise executed in, a server 300. In one embodiment, the server 300 is implemented as a single server having one or more processors and a memory storing instructions for execution by the one or more processors to perform the method 305. In an alternative embodiment, the server 300 may be implemented by two or more servers (e.g., the method may be performed by several servers in a distributed manner). An example of a server is described in conjunction with FIG. 8.

The selected playlist includes a queue of audio items to be played. The selected playlist may be generated in different ways such as being created by a curator, which will be described further in conjunction with FIG. 6A. Each audio item has at least one attribute, such as genre, danceability, energy, tempo, etc. The audio items in the selected playlist have at least one common attribute and may be grouped into coherent groups. The method comprises receiving, in step 350, a request to play the selected playlist. The request is received from a first electronic device 200-1 associated with a host listener. The first electronic device 200-1 is located within a geographic area. Such an area may for example be a house where a social gathering, such as a party, is ongoing or a room (e.g., living room) of the house. The geographical area may also be defined by the area within which electronic devices 200 associated with different listeners are able to communicate with each other, using a wireless local area network (e.g., WiFi), a wireless personal area network (e.g., Bluetooth), Near Field Communication (NFC), or other technologies.

The method further comprises receiving, in step 360, information about an identity of a guest listener located within the same geographic area as the first electronic device 200-1. In some embodiments, the identity is stored on a second electronic device 200-2 associated with the guest listener (e.g., the guest listener is the user of the second electronic device). The information about the guest listener may be received either from the first electronic device 200-1 or directly from the second electronic device 200-2. In some embodiments, the first electronic device 200-1 obtains or collects information about the identity of the guest listener from the second electronic device 200-2 when the guest listener "joins the party," (i.e. enters the geographic area), as will be described further in conjunction with FIG. 4.

In some embodiments, the received identity information about the guest listener is used by the server 300 for retrieving, in step 370, a taste profile parameter (or other indication of taste) of the guest listener. This taste profile parameter reflects the taste of the guest listener and may be stored in a database. The taste profile parameter may be based on the previous listening behavior of the guest listener. The taste profile parameter (or other indication of taste) may be used together with the information about common attributes of the audio items in the selected playlist for selecting, in step 375, an additional audio item. The additional audio item may as an alternative or an option be selected, in step 380, from a gross playlist associated with the selected playlist (e.g., in which the songs have at least one common attribute). The selection steps 375 and 380 may be combined when selecting additional audio items or be performed separately. This additional audio item is incorporated, in step 385, into the queue of audio items of the selected playlist. The additional audio item will be played in due course, unless playback of the playlist stops before the additional audio item is reached in the queue. Thus, a new updated playlist can be created by adding the additional audio item to the selected playlist without any direct user involvement of the guest listener.

A taste profile contains records corresponding to the taste (e.g., in audio items, such as music) of a user. For example, a taste profile is a representation of musical activity, and may include a wide range of information such as artist plays, song plays, skips, dates of listen by the user, songs per day, playlists, play counts, start/stop/skip data for portions of a song or album, contents of collections, user rankings/ratings, preferences, other mentions received via a client device, or other media plays, such as web sites visited, book titles, movies watched, playing activity during a movie or other presentations, ratings, or terms corresponding to the media, etc. In some embodiments, a taste profile includes, for a particular song or album, an artist name and/or a song or album title and one or more of the following: length of listening activity for the song, length of listening activity for the album, and user actions during song or album play, such as fast forwarding, track skipping, stopping or pausing the song, or other media plays, such as web sites visited, book titles, movies watched, playing activity during a movie or other presentations, ratings, or terms corresponding to the media. In some embodiments, a taste profile includes user data (e.g., gender, age, etc.), which may be obtained from a third party. In some embodiments, a taste profile is stored in a relational database at a server.

A taste profile parameter (i.e., taste profile attribute) is a score or summary relating to a taste profile, calculated based on one or more statistics for a taste profile. Taste profile parameters provide indications of the taste of a user. Examples of taste profile parameters are provided in US Patent Application Publication No. 2014/0279817, published Sep. 18, 2014, which is incorporated by reference herein in its entirety. Taste profiles are further discussed in US Patent Application Publication No. 2013/0262469, published Oct. 3, 2013, which is also incorporated by reference herein in its entirety.

Figure 5A:
FIGS. 5A and 5B schematically illustrate an example embodiment of adapting a selected playlist at a user interface of an electronic device, here exemplified by a mobile telephone such as a smartphone.
Figure 5B:
Figure 6A:
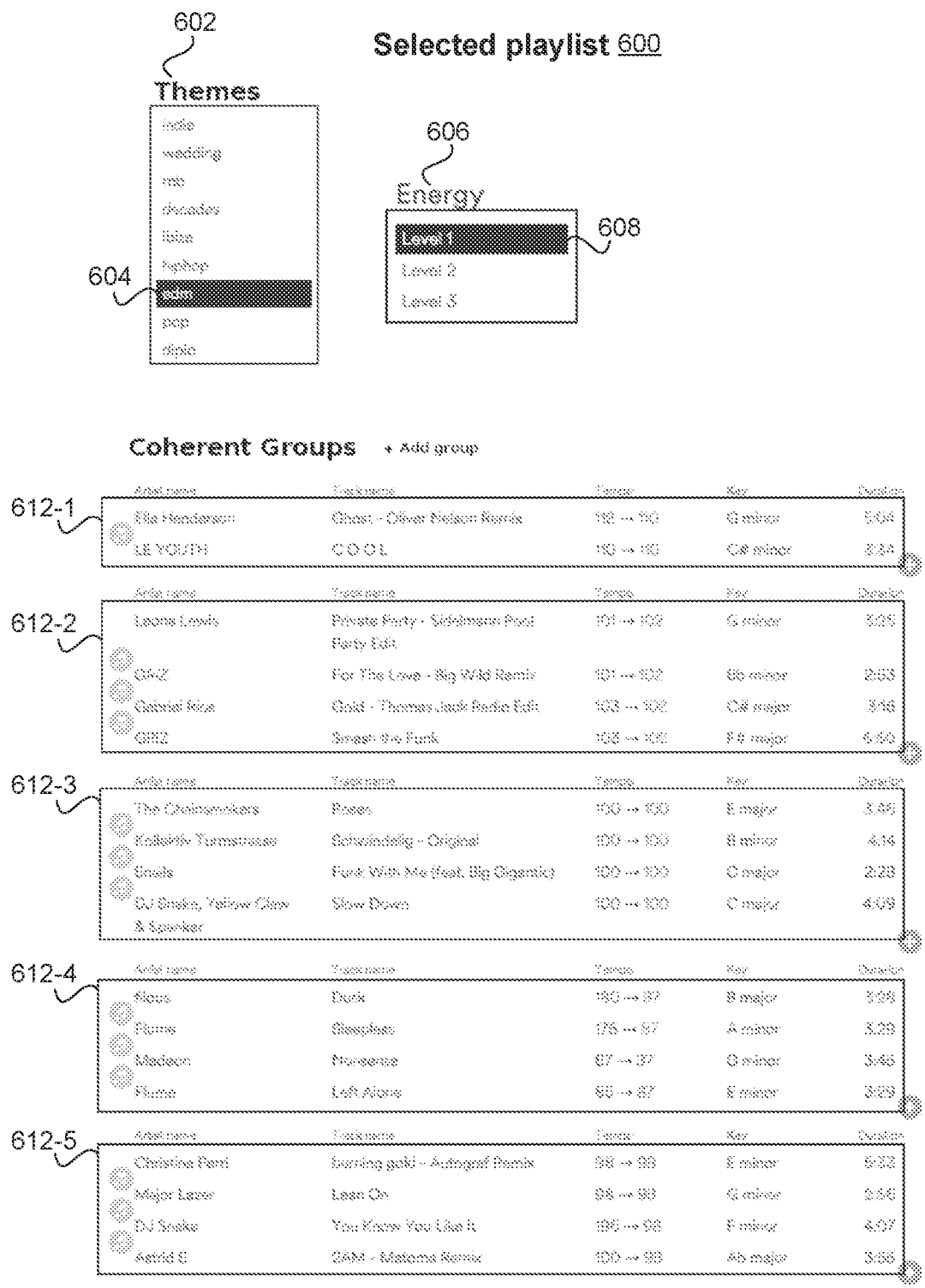
FIG. 6A schematically illustrates an example embodiment of a selected playlist.

FIGS. 5A and 5B schematically illustrate the incorporation (in step 385) of the additional audio item into the selected playlist in accordance with some embodiments. It may for example be indicated by textual information (e.g. "Jamie's party") that the selected playlist is associated with the host listener ("Jamie") on the first electronic device. The user interface shown in FIG. 5A thus displays a part (or, portion) of the selected playlist, in this example eight different audio items (e.g., songs). After the selection, in steps 375 and/or 380, of the additional audio item, it is incorporated into the selected playlist. In the example of FIG. 5B, a song with Song Title 5a is incorporated into the selected playlist, in step 385, after Song Title 5 and before Song Title 6. An additional audio item is thus incorporated into a selected playlist based on a guest listener's taste. In some embodiments, more than one additional audio item may be added to the selected playlist (e.g., at specified positions within the playlist). In FIGS. 6A and 6B another example of the incorporation of additional audio items will be described. It should also be understood that the incorporation may be done based on more than one guest listener, since there is often many more than one guest listener attending a social gathering, such as a party.

Turning back to FIG. 3, as mentioned above, the selecting, in step 375, of the additional audio item is made among audio items matching the taste profile parameter of the guest listener and at least one common attribute of the selected playlist, in accordance with some embodiments. The common attribute of the selected playlist may for example be related to the genre, danceability, energy, tempo, etc. of the audio items. Additionally, as mentioned above in step 380, the selection may also be done by selecting the additional audio item from a gross playlist associated with the selected playlist. The gross playlist may comprise songs having at least one common attribute.

In some embodiments, the server 300 receives geographic information about the first electronic device 200-1 in optional step 355 and geographic information about the second electronic device 200-2 in optional step 365. The geographic information of the first electronic device 200-1 and second electronic device 200-2 may be received together with the request of step 350 and/or the information about the identity of the guest listener or it may be received separately. The geographical information from the electronic devices 200 may be used to determine if the electronic devices are within the same geographic area, for example if the electronic devices (and associated listeners) are attending the same party. In some implementations, each electronic device 200 determines its respective geographic location by using a Global Navigation Satellite System (GNSS) (e.g., the Global Positioning System (GPS)) or through trilateration of received signal strengths. Based on the received geographic information, the server 300 determines whether the first and second electronic devices 200-1 and 200-2 are located within a defined geographic area or proximity.

In other implementations, the electronic devices may, as is also mentioned hereinabove, communicate with one another using WiFi, Bluetooth, NFC, or other technologies to determine whether they are within a predefined distance of one another (i.e., whether they are located within the same predefined geographical area). Once it is determined that any electronic device 200 is within the same predefined geographic area as another electronic device 200, this information may be sent to the server 300. This information may be sent from each electronic device 200 or from the first electronic device 200-1 (host device), which may collect this information from the other electronic devices 200. The server 300 may thus be informed that the electronic devices 200 are located in proximity to one another (i.e. the electronic devices 200 are within a defined geographic area).

Figure 4:
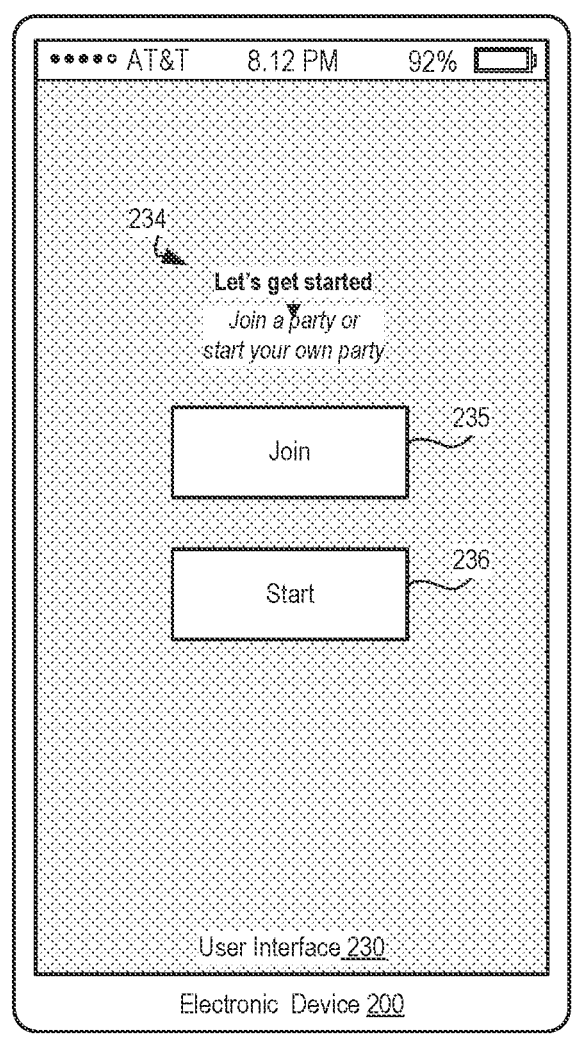
FIG. 4 schematically illustrates an example embodiment of a user interface of an electronic device, here exemplified by a mobile telephone such as a smartphone.

Turning now to FIG. 4, an example scenario applied at a social gathering (e.g. a party) will be described in further detail. FIG. 4 schematically illustrates an example user interface 230 of an electronic device 200, in the form of a mobile phone. In this example a user or listener is presented with textual information 234 that presents selectable user preference options to the listener. The listener may for example be presented by icons 235 (e.g., "Join") and 236 (e.g., "Start") corresponding to the selectable user preference options. In this example, the textual information 234 is "Let's get started. Join apart); or start your own party." The host listener or one of the host listeners would select "Start" icon 236. Thereafter the host listener selects the playlist. When other listeners (i.e. guest listeners) reach the same geographic area as the first electronic device 200-1 (i.e., the electronic device 200 of the host listener), associated with the host listener, they may want to join the party. This may be done by selecting "Join" icon 235. By joining the party the guest listeners' tastes will affect the selected playlist using the method described above in conjunction with FIG. 3. It is also possible that a guest listener sets "Join" as a default option in the media playback software application 220 (FIG. 2). By setting "Join" as a default option the guest listener will automatically be connected to the party when the second electronic device 200-2 (i.e., the electronic device 200 of the guest listener) reaches the same predefined geographic area as the first electronic device 200-1. This option makes it possible to adapt the selected playlist to the taste of guest listeners that are within the same geographic area without any user involvement. For example, joining the party may be done by enabling a function that makes the electronic device 200 of a guest listener discoverable by the electronic device 200 of any other listener (e.g., by the host listener's electronic device 200-1) within a defined region (e.g., within a specified radius). After enabling the function once, the listener need not explicitly join future parties because his or her electronic device 200 will join parties automatically when it is within range of other electronic devices 200 (e.g., of the host listener's electronic device 200-1). The guest listener's electronic device may be discoverable by an arbitrary amount of electronic devices (e.g., associated with hosts) at once. This, in turn, may lead to improved listening experiences for a guest listener (e.g. at social gatherings such as parties), since the taste of the guest listener will be taken into account even though the host listener already selected a playlist.

FIGS. 6A and 6B show a selected playlist 600 and a gross playlist 620 associated therewith in accordance with some embodiments. The selected playlist 600 is shown in FIG. 6A. When a host wants to start a party he or she selects a playlist. Such playlists may for example be provided by different content providers and may have been created by a curator. The host may select one or more attributes for the playlist 600 and thus for the party. In the example shown in FIG. 6A the host may select a theme 602 (e.g., Electronic Dance Music, "edm" 604) and an energy level 606 (e.g., energy level 1 608) for the "party". These selections render the selected playlist 600 (FIG. 6A). In the selected playlist 600 the songs are shown as different coherent groups or clusters 612-1 through 612-5, which are groups of songs that are mixed together by a curator. In some embodiments, each coherent group is seen as one song, since the songs within the coherent group cannot be separated from each other (i.e. a coherent group will be played uninterrupted). In some embodiments, the transitions between songs in a coherent group are pre-calculated. FIG. 6A shows five different coherent groups. The number of songs in a coherent group may be chosen freely. It is between these coherent groups that the additional audio items are to be incorporated (e.g., in step 385, FIG. 3).

In some embodiments the additional audio item is selected from the associated gross playlist 620 depicted in FIG. 6B. A gross playlist is a playlist in which the content items have at least one common attribute. For example, the gross playlist 620 has a large (e.g., larger than the playlist) selection of music belonging to the same party theme as the selected playlist 600 (e.g., Electronic Dance Music Energy Level 1). In FIG. 6B only a part of the gross playlist 620 is shown; as indicated by the arrow, the list is in reality longer. The selected playlist is a selection of songs from the associated gross playlist and the songs of the gross playlist which are not curated into the selected playlist may be inserted between the coherent groups based on the taste of the guest listeners. There are many options in how the selection of additional audio items may be made. For example, the songs on the gross playlist may be scored based on indications of the taste of the guest listeners that are within the same predefined geographical area. The taste may be defined as (i.e., indicated by) the listening count for each song on the gross playlist. The song with the highest listening count (e.g., among the songs in the gross playlist that are not already included in the selected playlist) is then added after the end of a coherent group (e.g., the first coherent group) of the selected playlist. By allowing incorporation only between the coherent groups in accordance with some embodiments, it is ensured that the selected playlist basically remains as created by the curator but with a guest listener touch. The benefit is that the guest listener touch is realized with songs from the gross playlist, which have been selected by the curator such that they fit together with the songs on the selected playlist. Thus, it is possible to have a curator-produced (e.g., DJ-produced) party playlist which also takes into account the taste of guest listeners attending the party.

Figure 7:
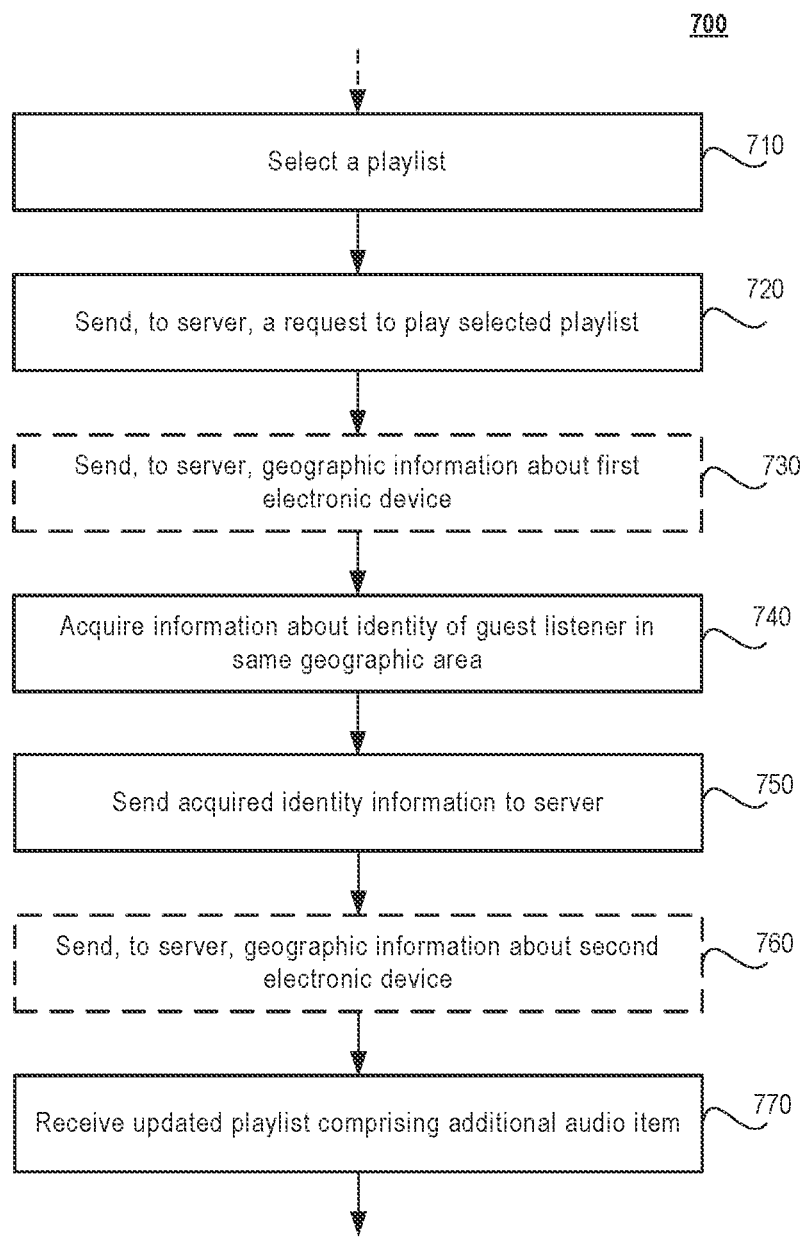
FIG. 7 schematically illustrates a flowchart of a method in accordance with some embodiments.

FIG. 7 schematically illustrates a flowchart of a method 700 for adapting a selected playlist to the taste of listeners that are located within a geographic area. The method 700 may be performed by, or otherwise executed in, a first electronic device 200-1 associated with a host listener. The first electronic device 200-1 may have one or more processors and a memory storing instructions for execution by the one or more processors. The first electronic device 200-1 is located within a geographic area. Such an area may for example be a house where a social gathering, such as a party, is ongoing or a room (e.g., living room) of the house. The geographical area may also be defined by the area within which electronic devices 200 associated with different listeners are able to communicate with each other, using Bluetooth, NFC, or other wireless technologies. An example of an electronic device 200 is described in conjunction with FIG. 10.

The method 700 starts with step 710, in which the host listener selects a playlist. The selected playlist includes a queue of audio items to be played. Each audio item has at least one attribute, such as genre, danceability, energy, tempo, etc. In some embodiments, the audio items in the selected playlist have at least one common attribute. In step 720 the first electronic device 200-1 sends a request to play the selected playlist to a server 300. The first electronic device 200-1 also, in step 740, acquires information about identities of guest listeners located within the same area as the first electronic device 200-1. These identities are stored on electronic devices 200 associated with the guest listeners. The identity information of each guest listener is related to an indication of taste (e.g., a taste profile parameter) of each guest listener. The indication of taste (e.g., taste profile parameter) may be stored in a database accessible by the server 300, which uses the identity information to retrieve the indication of taste. In step 750 the acquired identity information is sent to the server 300.

In step 770 the first electronic device 200-1 receives an updated playlist from the server 300. The updated playlist comprises at least one additional audio item or song. The updated playlist has been created by the server 300 taking into account the indication(s) of taste of the guest listener(s). For example, the server 300 selects the at least one additional audio item by matching the indication(s) of taste with at least one common attribute of the audio items of the selected playlist. The common attribute of the selected playlist may, as mentioned above, be related to the genre, danceability, energy, tempo, etc. of the audio items.

In some embodiments the first electronic device 200-1 may in addition to sending the request to play the selected playlist to the server also send geographic information about itself in optional step 730, shown with dashed lines in FIG. 7. Another, optional step is step 760, in which geographic information about the second electronic device 200-2 (and/or other geographic information for other electronic devices 200 of other guest listeners) is sent to the server 300.

The geographical information from the electronic devices 200 may, as mentioned above, be used to determine if the electronic devices 200 are within the same geographic area, for example if the electronic devices 200 (and their associated listeners) are attending the same party. This information may be obtained by comparing known locations of the electronic devices 200 or by direct communication between the electronic devices 200 by using Bluetooth, NFC or other technologies. This has already been described above in conjunction with FIG. 3 and is therefore not repeated once again here.

Figure 8:
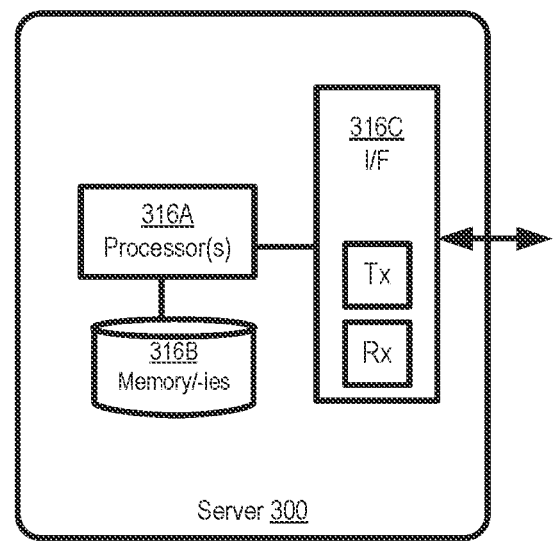
FIG. 8 shows an example of a server in accordance with some embodiments.

Reference is now made to FIG. 8, which schematically illustrates a server 300 (see FIGS. 1 and 2) in accordance with some embodiments. The server 300 is configured to perform, or otherwise execute, the method 305 in accordance with FIG. 3. To this end, the server 300 comprises hardware resources 316 as described earlier herein. For example, the server 300 may comprise one or more processors 316A and one or more memories 316B. Also, a communications interface 316C, or a communications circuitry, may be provided to allow the server 300 to communicate with electronic devices 200, other servers 300, and/or media presentation systems 500 (e.g. via a network 400 such as the Internet, FIG. 1). To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the server 300 to communicate with electronic devices 200, other servers 300, and/or media presentation systems 500 through a radio frequency band through the use of different radio frequency technologies such as LTE (Long Term Evolution), WCDMA (Wideband Code Division Multiple Access), any other cellular network (e.g., as standardized by the 3rd Generation Partnership Project (3GPP)), or any other wireless technology such as Wi-Fi, Bluetooth, etc. As described with reference to FIG. 2, the server 300 may also comprise one or more applications (e.g. the software application 310 including the media server application 312). The applications are sets of instructions (e.g., computer program code), stored in memory 316B, that when executed by the one or more processors 316A control the operation of the server 300. In some embodiments, the one or more applications include instructions for performing the method 305 (FIG. 3).

In some implementations, the one or more memories 316B store computer program code, which, when run in the one or more processors 316A causes the server 300 to adapt a selected playlist to the taste of listeners that are located within a geographic area. The selected play list includes a queue of audio items to be played. In some embodiments, the audio items have a common attribute, such as genre. Additionally, the one or more memories 316B stores computer program code, which, when run in the one or more processors 316A causes the server 300 to receive (e.g. receive via the I/F 316C) a request to play the selected playlist from a first electronic device 200-1, the first device being located within a geographic area and also receive (e.g. receive via the I/F 316C) information about an identity of a guest listener located within the same geographic area as the first electronic device 200-1. The identity being stored on a second electronic device 200-2 associated with the guest listener. In some implementations, the information about the identity of the guest listener may be received (e.g. received via the I/F 316C) from the first electronic device 200-1 or directly from the second electronic device 200-2. In some implementations, the one or more memories 316B stores computer program code, which, when run in the one or more processors 316A causes the server 300 to retrieve an indication of taste (e.g., a taste profile parameter) of the guest listener based on the previously received identity information. Additionally, the one or more memories 316B may store computer program code, which, when run in the one or more processors 316A causes the server 300 to select an additional audio item based on the retrieved indication of taste (e.g., taste profile parameter) of the guest listener and the common attribute of the audio items of the selected playlist and incorporate the selected audio item into the queue of audio items of the selected playlist.

The one or more memories 316B may also comprise (i.e., store) instructions executable by the one or more processors 316A whereby the server 300 is operative to select the additional audio item among audio items matching the taste profile parameter of the guest listener and also having the same attribute as the common attribute of the selected playlist. One such common attribute may be related to the genre, danceability, energy, tempo, etc. of the audio items.

Figure 9:
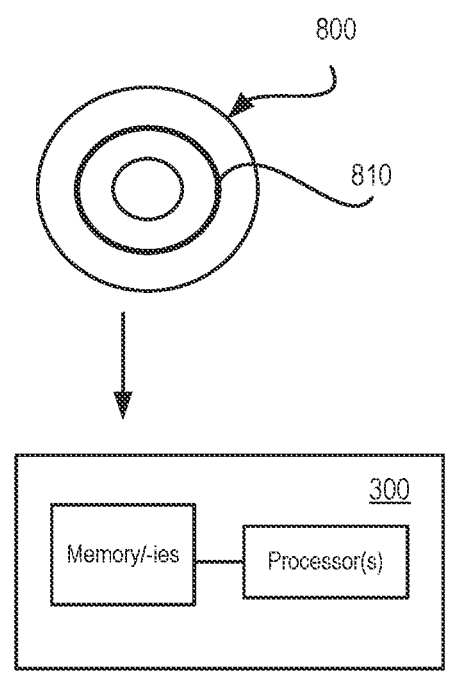
FIG. 9 illustrates a carrier comprising a computer program, in accordance with some embodiments.

FIG. 9 shows an example of a computer-readable medium, in this example in the form of a data disc 800. In some embodiments the data disc 800 is a magnetic data storage disc. The data disc 800 is configured to carry instructions 810 that can be loaded into a memory 316B of an electronic device (e.g. server 300). Upon execution of the instructions by a processor 316A of the server 300, the server 300 is caused to execute a method or procedure according to embodiments described herein (e.g., the method 305, FIG. 3). The data disc 800 is arranged to be connected to or within and read by a reading device (not shown), for loading the instructions into the memory 316B for execution by the processor(s) 316A. One such example of a reading device in combination with one (or several) data disc(s) 800 is a hard drive. It should be noted that the computer-readable medium can also be other mediums such as compact discs, flash memories or other memory technologies commonly used. In such embodiments the data disc 800 is one type of a tangible, non-transitory computer-readable medium. The instructions may alternatively be downloaded to a computer data reading device, such as a server 300 capable of reading computer coded data on a computer-readable medium, by encoding the instructions in a computer-readable signal (not shown) which is transmitted via a wireless (or wired) interface (for example via the Internet) to the computer data reading device for loading the instructions into the memory 316B of the server 300. In such embodiments, the computer-readable signal is one type of a non-tangible computer-readable medium.

Figure 10:
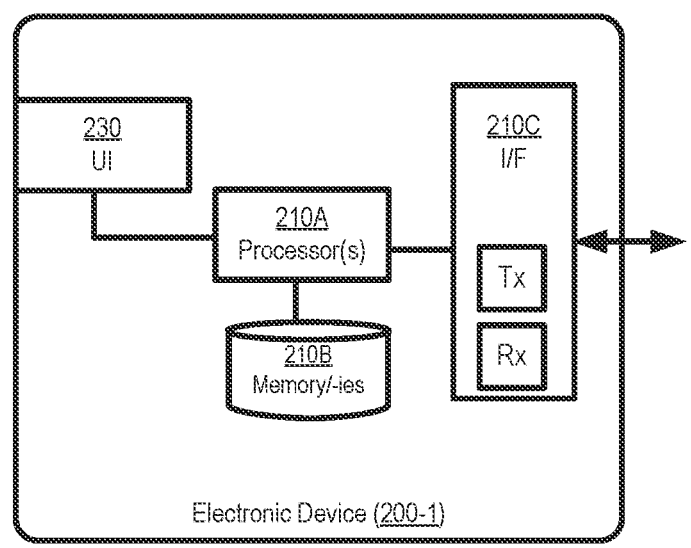
FIG. 10 shows an example of an electronic device in accordance with some embodiments.

Reference is now made to FIG. 10, which schematically illustrates an example of the first electronic device 200-1 in accordance with some embodiments. The first electronic device 200-1 is configured to perform, or otherwise execute, the method 700 (FIG. 7). To this end, the first electronic device 200-1 comprises a user interface 230. The first electronic device 200-1 also comprises hardware resources 210 (see also FIG. 2). For example, the first electronic device 200-1 may comprise one or more processors 210A and one or more memories 210B. Also, a communications interface 210C, or a communications circuitry, may be provided to allow the first electronic device 200-1 to communicate with other electronic devices 200, servers 300, and/or media presentation systems 500 (e.g. via a network 400 such as the Internet, FIG. 1). To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the first electronic device 200-1 to communicate with electronic devices 200, servers 300, and/or media presentation systems 500 through a radio frequency band through the use of different radio frequency technologies such as LTE (Long Term Evolution), WCDMA (Wideband Code Division Multiple Access), any other cellular network (e.g., as standardized by the 3rd Generation Partnership Project (3GPP)), or any other wireless technology such as Wi-Fi, Bluetooth, etc. As can be seen in FIG. 2, the first electronic device 200-1 may also comprise one or more applications (e.g. the media playback software application 220). The applications are sets of instructions (e.g., computer program code) that when executed by the one or more processors 210A controls the operation of the first electronic device 200-1 (e.g., causes the first electronic device 200-1 to perform the method 700, FIG. 7).

In some implementations, the one or more memories 210B store computer program code, which, when run in the one or more processors 210A causes the first electronic device 200-1 to adapt a selected playlist to the taste of listeners that are located within a geographic area. The playlist includes a queue of audio items to be played. In some embodiments, the audio items of the selected playlist have at least one common attribute.

The one or more memories 210B may further comprise (i.e., store) instructions executable by the one or more processors 210A whereby the first electronic device 200-1 is operative to send, to the server 300, a request to play the selected playlist; acquire information about an identity of a guest listener located within the same geographic area as the first electronic device, the identity being stored on a second electronic device 200-2 associated with the guest listener; send the acquired identity information, relating to an indication of taste (e.g., a taste profile parameter) of the guest listener, to the server; and receive an updated playlist from the server, the updated playlist comprising at least one additional audio item, which has been selected based on the indication of taste (e.g., taste profile parameter) of the guest listener and the common attribute of the audio items of the selected playlist.

In some embodiments, the one or more memories 210B may comprise instructions executable by the one or more processors 210A whereby the first electronic device 200-1 is further operative to send to the server 300 geographic information about itself and/or send geographic information about the second electronic device 200-2 (e.g., together with the request to play the selected playlist and/or the information about the identity of the guest listener).

Figure 11:
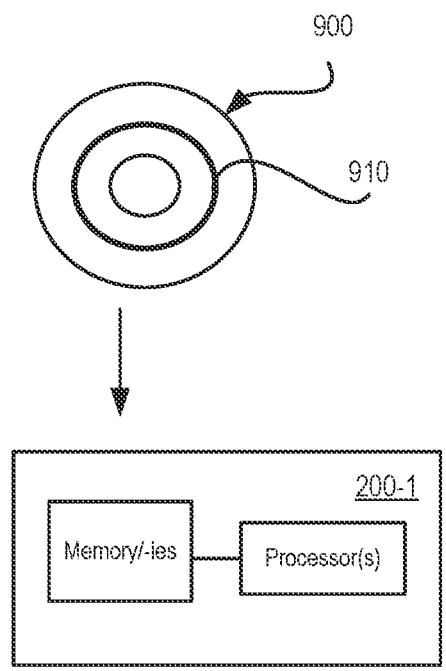
FIG. 11 illustrates a carrier comprising a computer program, in accordance with some embodiments.

FIG. 11 shows an example of a computer-readable medium, in this example in the form of a data disc 900. In some embodiments the data disc 900 is a magnetic data storage disc. The data disc 900 is configured to carry instructions 910 that can be loaded into a memory 201B of an electronic device 200 (e.g. the first electronic device 200-1). Upon execution of the instructions by a processor 210A of the electronic device 200, the electronic device 200 is caused to execute a method or procedure according to embodiments described herein (e.g., the method 700, FIG. 7). The data disc 900 is arranged to be connected to or within and read by a reading device (not shown), for loading the instructions into the memory 210B for execution by the processor(s) 210A. One such example of a reading device in combination with one (or several) data disc(s) 900 is a hard drive. It should be noted that the computer-readable medium can also be other mediums such as compact discs, flash memories or other memory technologies commonly used. In such embodiments the data disc 900 is one type of a tangible, non-transitory computer-readable medium. The instructions may alternatively be downloaded to a computer data reading device, such as an electronic device 200 capable of reading computer coded data on a computer-readable medium, by encoding the instructions in a computer-readable signal (not shown) which is transmitted via a wireless (or wired) interface (for example via the Internet) to the computer data reading device for loading the instructions into the memory 210B of the electronic device 200. In such embodiments, the computer-readable signal is one type of a non-tangible computer-readable medium.

Various embodiments described throughout this disclosure allow several users to collaboratively control the queue of audio items in a playlist, while avoiding disagreements among the users or listeners. Achieving this collaborative control while avoiding disagreements leads to improved user experiences at social gatherings. For example, a selected playlist may be adapted to the taste of guest users without any user involvement.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in a computer-readable medium and so executed by a computer or processor, whether or not such computer or processor is explicitly shown. The functions of the various elements including functional blocks may be provided through the use of hardware such as circuit hardware and/or hardware capable of executing software in the form of coded instructions stored on the above-mentioned computer-readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method comprising:
while playing a first media item in a first coherent group from a playlist that includes a plurality of coherent groups at a first presentation device associated with a first user, wherein the first user is a host of a party listening session and wherein each coherent group of the plurality of coherent groups includes a group of media items having a common attribute that are played uninterrupted from each other:
automatically receiving an identifier associated with a second user, as a participant of the party listening session, having a second electronic device, without explicit input from the second user after the second electronic device comes within range of a first electronic device, different from the first presentation device and from the second electronic device, associated with the first user;
in response to receiving the identifier associated with the second user, automatically adapting the party listening session to include an additional media content item based at least in part on the identifier associated with the second user, including:
obtaining a taste profile parameter of the second user that indicates previous listening behavior of the second user; and
selecting the additional media content item based on the previous listening behavior of the second user and a respective common attribute of the additional media content item and the first media item in the first coherent group of the plurality of coherent groups, the respective common attribute selected from one or more attributes including danceability, energy and/or tempo; and
outputting for playback, at the first presentation device, the additional media content item after completing playback of the first coherent group.

2. The method according to claim 1, wherein the first electronic device receives the identifier associated with the second user from the second electronic device.

3. The method according to claim 1, wherein a server receives the identifier associated with the second user from the first electronic device.

4. The method according to claim 1, wherein:
a playlist streamed at the first presentation device includes media content items having a second common attribute, and
the additional media content item is selected based at least in part on the second common attribute of the playlist.

5. The method according to claim 4, wherein the additional media content item is selected from media content items of a gross playlist associated with the playlist, wherein the gross playlist includes more media content items than the playlist and the media content items of the gross playlist have the second common attribute.

6. The method according to claim 1, further comprising, determining an indication of taste of the second user based on the identifier associated with the second user, wherein the indication of taste of the second user includes a taste profile parameter of the second user.

7. The method according to claim 6, wherein the additional media content item is selected from audio items that match the taste profile parameter of the second user.

8. The method according to claim 1, further comprising, determining an indication of taste of the second user based on the identifier associated with the second user, wherein the indication of taste of the second user includes listening counts for respective media content items.

9. The method according to claim 2, further comprising:
determining geographic information about the first electronic device;
receiving geographic information about the second electronic device; and
determining that the first and second electronic devices are within a same geographic area;
wherein the additional media content item is selected in response to determining that the first and second electronic devices are within the same geographic area.

10. The method according to claim 1, wherein receiving the identifier associated with the second user is performed after a function is enabled that makes the second electronic device discoverable by the first electronic device.

11. A computing device comprising:
one or more processors; and
memory storing instructions executable by the one or more processors to cause the computing device to:
while playing a first media item in a first coherent group from a playlist that includes a plurality of coherent groups at a first presentation device associated with a first user, wherein the first user is a host of a party listening session and wherein each coherent group of the plurality of coherent groups includes a group of media items having a common attribute that are played uninterrupted from each other:
automatically receiving an identifier associated with a second user, as a participant of the party listening session, having a second electronic device, without explicit input from the second user after the second electronic device comes within range of a first electronic device, different from the first presentation device and from the second electronic device, associated with the first user;
in response to receiving the identifier associated with the second user, automatically adapting the party listening session to include an additional media content item based at least in part on the identifier associated with the second user, including:
obtaining a taste profile parameter of the second user that indicates previous listening behavior of the second user; and
selecting the additional media content item based on the previous listening behavior of the second user and a respective common attribute of the additional media content item and the first media item in the first coherent group of the plurality of coherent groups, the respective common attribute selected from one or more attributes including danceability, energy and/or tempo; and
outputting for playback, at the first presentation device, the additional media content item after completing playback of the first coherent group.

12. The computing device according to claim 11, wherein the first electronic device receives the identifier associated with the second user from the second electronic device.

13. The computing device according to claim 11, wherein a server receives the identifier associated with the second user from the first electronic device.

14. The computing device according to claim 11, wherein a playlist streamed at the first presentation device includes media content items having a second common attribute, and
the additional media content item is selected based at least in part on the second common attribute of the playlist.

15. The computing device according to claim 14, wherein the additional media content item is selected from media content items of a gross playlist associated with the playlist, wherein the gross playlist includes more media content items than the playlist and the media content items of the gross playlist have the second common attribute.

16. The computing device according to claim 11, wherein the instructions are further executable by the one or more processors to cause the computing device to, determine an indication of taste of the second user based on the identifier associated with the second user, wherein the indication of taste of the second user includes a taste profile parameter of the second user.

17. The computing device according to claim 16, wherein the additional media content item is selected from audio items that match the taste profile parameter of the second user.

18. The computing device according to claim 11, wherein the instructions are further executable by the one or more processors to cause the computing device to determine an indication of taste of the second user based on the identifier associated with the second user, wherein the indication of taste of the second user includes listening counts for respective media content items.

19. A non-transitory computer-readable storage medium storing one or more programs for execution by a computing device having one or more processors and memory, the one or more programs comprising instructions for:
while playing a first media item in a first coherent group from a playlist that includes a plurality of coherent groups at a first presentation device associated with a first user, wherein the first user is a host of a party listening session and wherein each coherent group of the plurality of coherent groups includes a group of media items having a common attribute that are played uninterrupted from each other:
automatically receiving an identifier associated with a second user, as a participant of the party listening session, having a second electronic device, without explicit input from the second user after the second electronic device comes within range of a first electronic device, different from the first presentation device and from the second electronic device, associated with the first user;

in response to receiving the identifier associated with the second user, automatically adapting the party listening session to include an additional media content item based at least in part on the identifier associated with the second user, including:
  obtaining a taste profile parameter of the second user that indicates previous listening behavior of the second user; and
  selecting the additional media content item based on the previous listening behavior of the second user and a respective common attribute of the additional media content item and the first media item in the first coherent group of the plurality of coherent groups, the respective common attribute selected from one or more attributes including danceability, energy and/or tempo; and
outputting for playback, at the first presentation device, the additional media content item after completing playback of the first coherent group.

\* \* \* \* \*